C. R. DARNALL.
PROCESS OF PURIFYING WATER AND SEWAGE.
APPLICATION FILED AUG. 5, 1910.
1,007,647.
Patented Oct. 31, 1911.
6 SHEETS—SHEET 1.
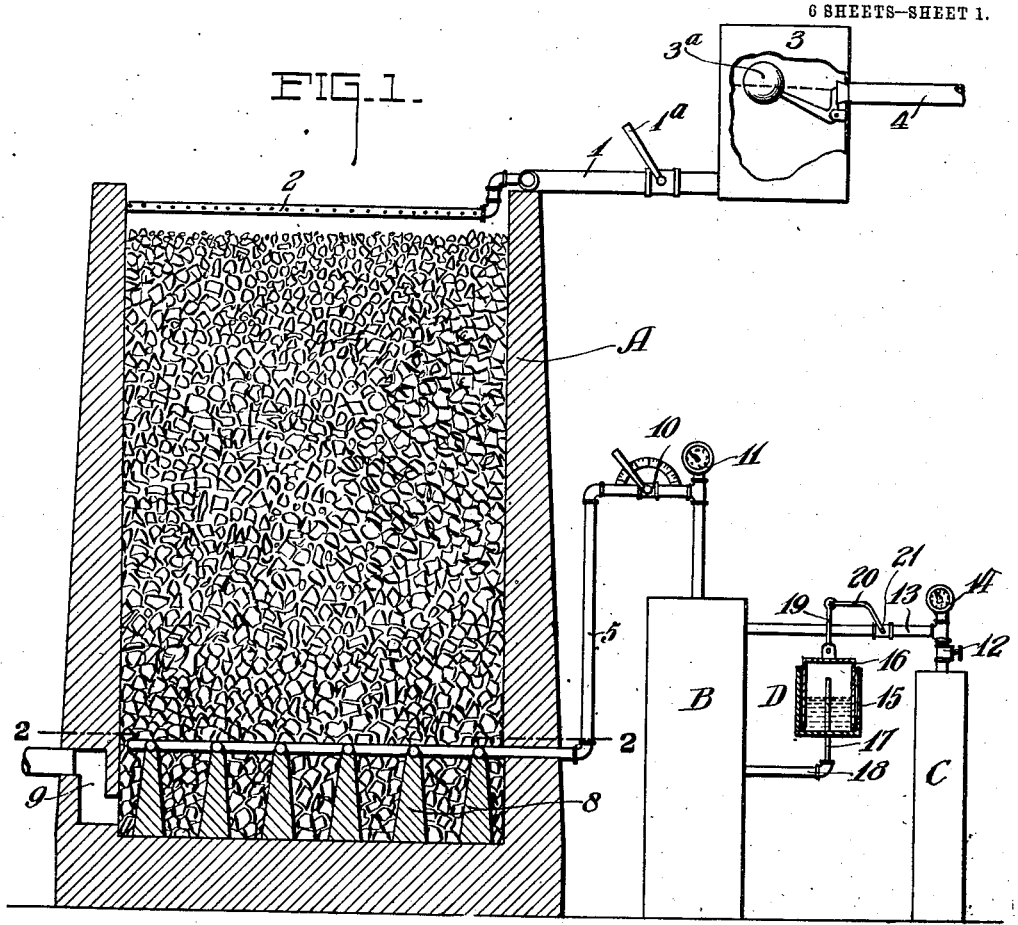
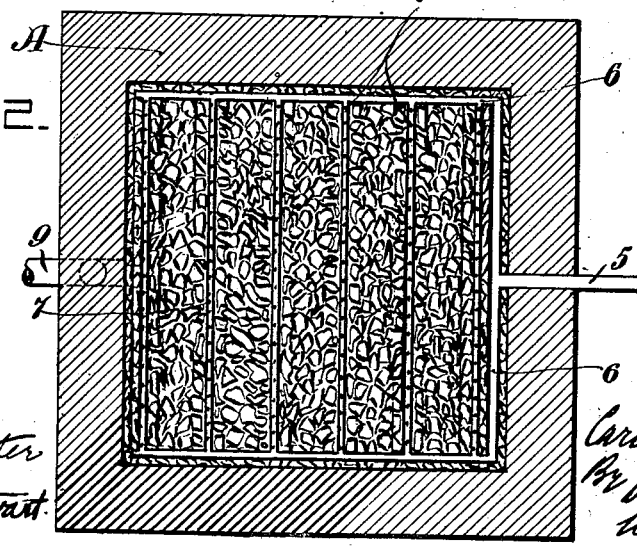
Witnesses
Inventor C. R. DARNALL.
PROCESS OF PURIFYING WATER AND SEWAGE.
APPLICATION FILED AUG. 5, 1910.
1,007,647.
Patented Oct. 31, 1911.
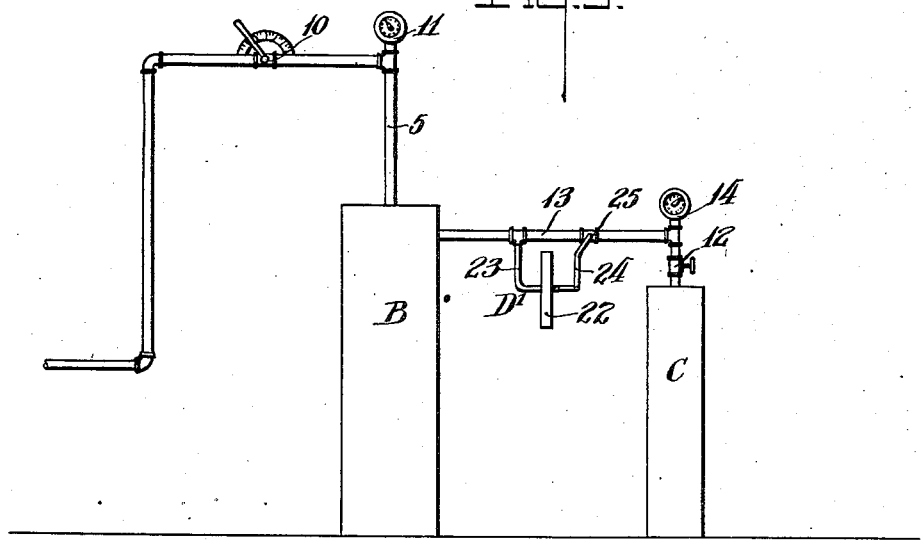
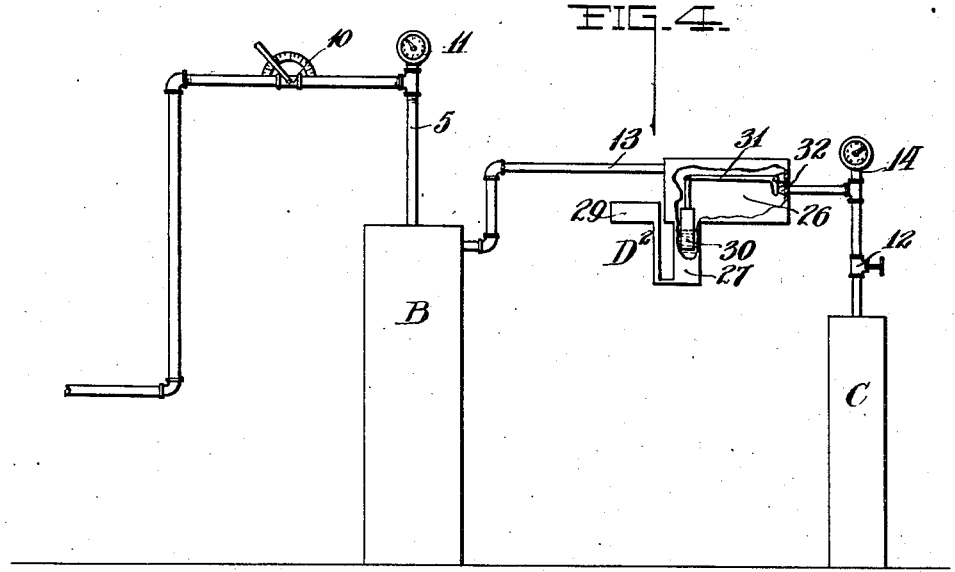

C. R. DARNALL.
PROCESS OF PURIFYING WATER AND SEWAGE.
APPLICATION FILED AUG. 5, 1910.
1,007,647.
Patented Oct. 31, 1911.
6 SHEETS—SHEET 3.
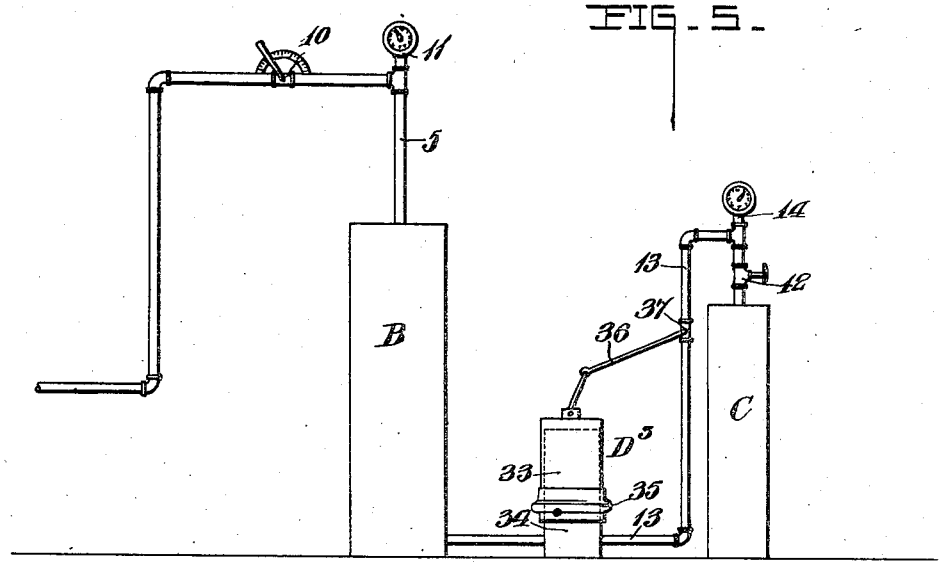
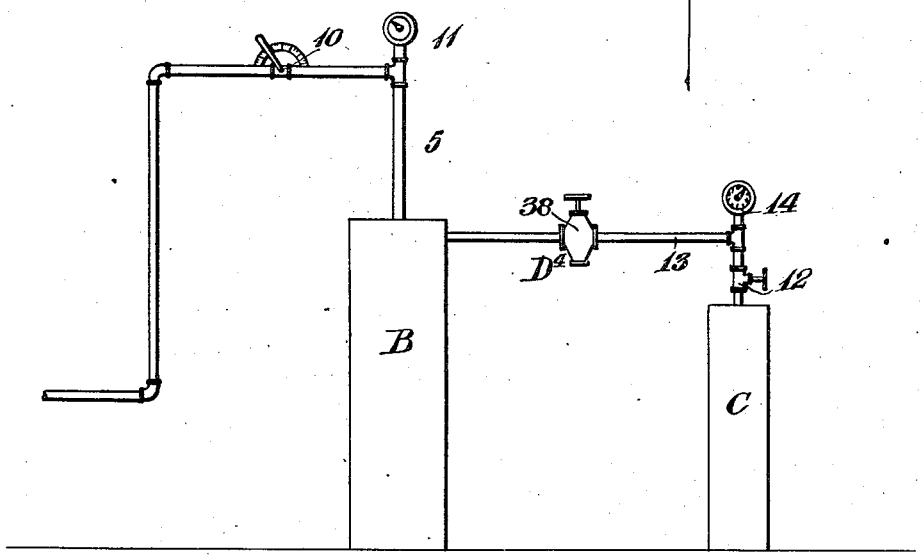

C. R. DARNALL.
PROCESS OF PURIFYING WATER AND SEWAGE.
APPLICATION FILED AUG. 5, 1910.
1,007,647.
Patented Oct. 31, 1911.
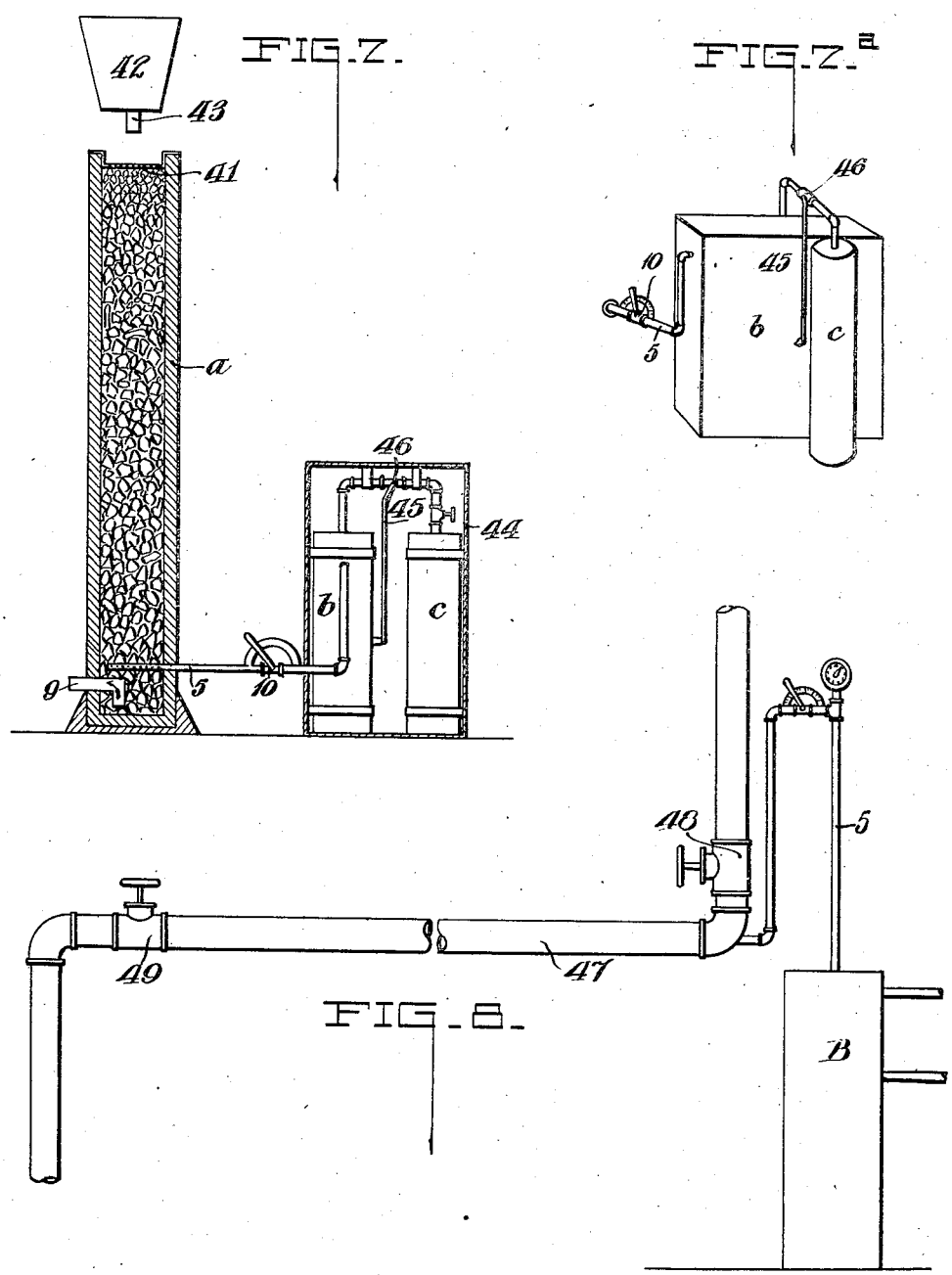

C. R. DARNALL.
PROCESS OF PURIFYING WATER AND SEWAGE.
APPLICATION FILED AUG. 5, 1910.
1,007,647.
Patented Oct. 31, 1911.
6 SHEETS—SHEET 5.
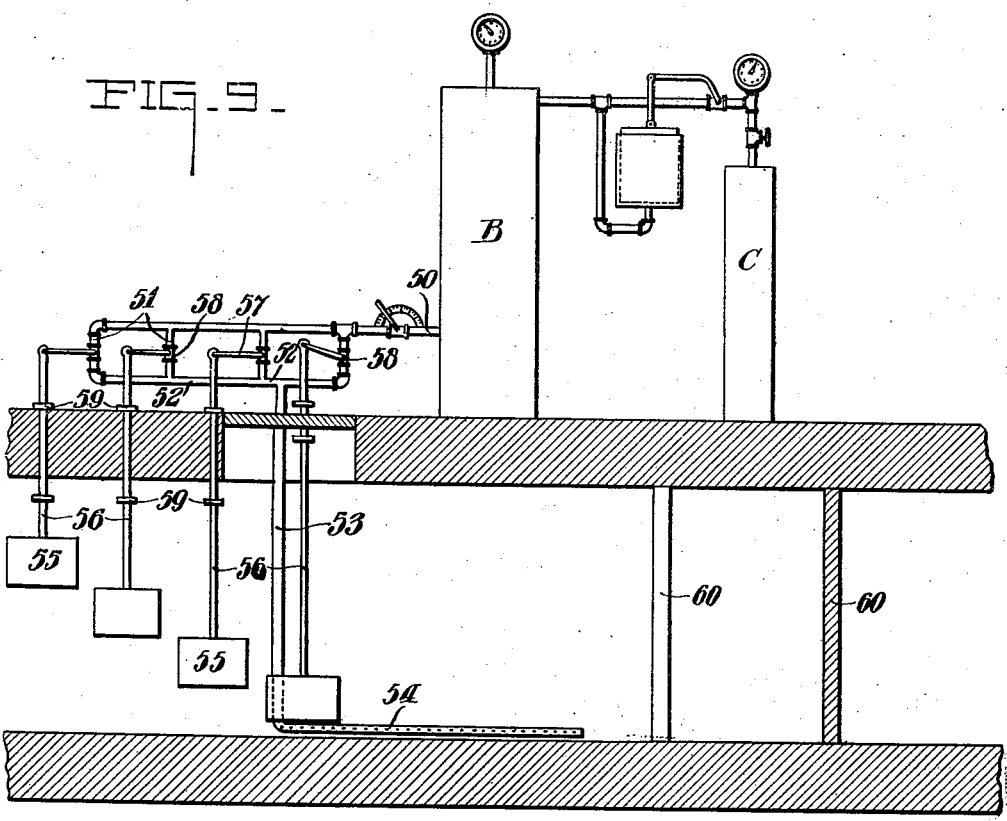
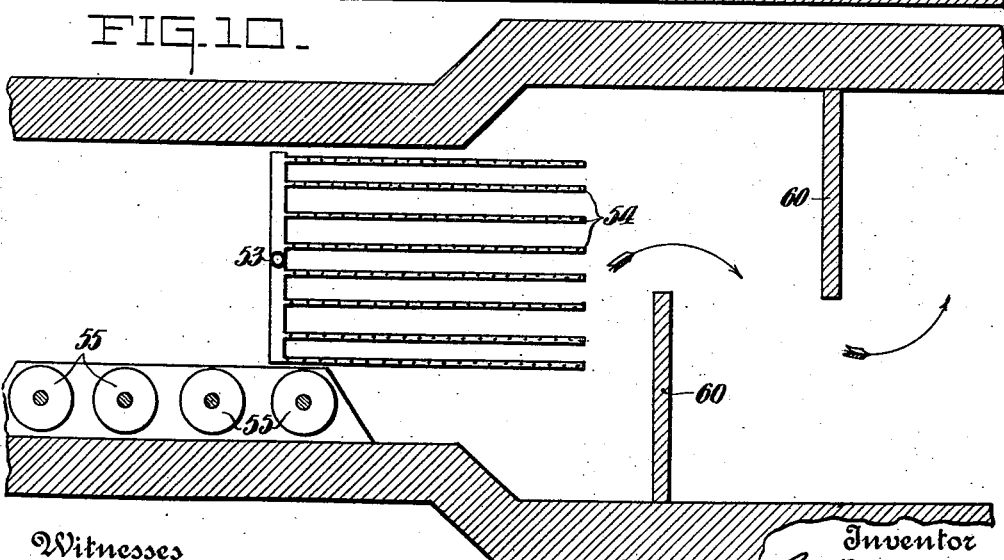

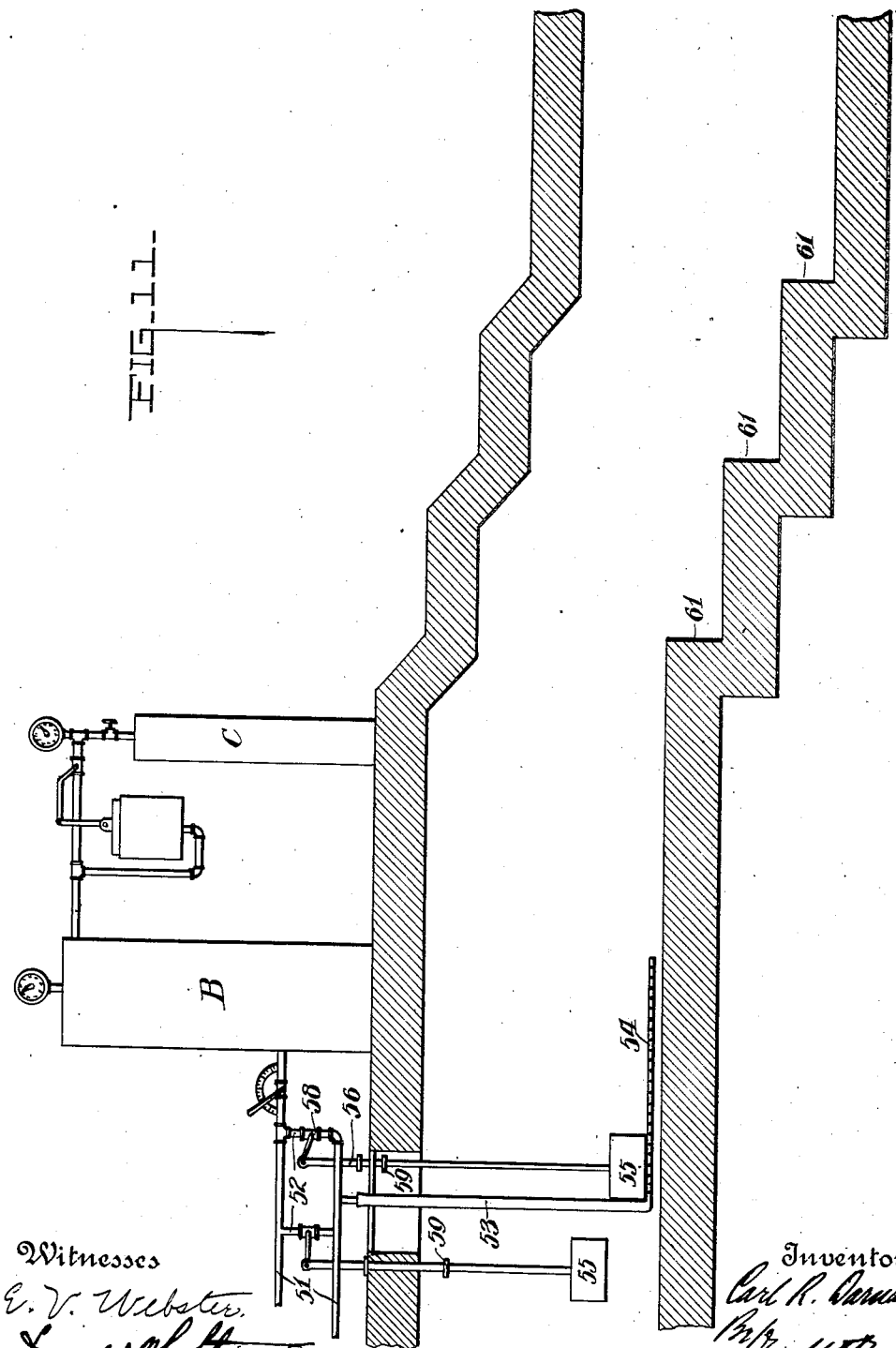

UNITED STATES PATENT OFFICE.

CARL R. DARNALL, OF WASHINGTON, DISTRICT OF COLUMBIA.

PROCESS OF PURIFYING WATER AND SEWAGE.

1,007,647.

Specification of Letters Patent. Patented Oct. 31, 1911.

Application filed August 5, 1910. Serial No. 575,651.

*To all whom it may concern:*

Be it known that I, CARL ROGER DARNALL, a citizen of the United States, residing at Washington, in the District of Columbia, have invented certain new and useful Improvements in Processes of Purifying Water and Sewage, of which the following is a specification.

My invention relates to the purification or sterilization of water, sewage and other fluids by treating with chlorin gas in sufficient quantity to destroy the bacteria and other living organisms present in the fluid.

This invention relates to the purification of water and sewage, and has for its object the provision of a method and apparatus whereby dry chlorin gas may be used in a practical and efficient manner for purifying water, and the chlorin accurately supplied in the desired quantity to effect the desired result without waste or imparting an unpleasant odor to the water.

Chlorinated lime and chlorinated soda have recently come into use for disinfecting sewage, and at various times it has been attempted to use chlorin gas for similar purposes but not in a dry state. The chlorinated lime or soda, or the chlorin gas, has usually been mixed with a certain quantity of water and determined amounts of this chlorinated water have been introduced into the effluvia to be disinfected. This is not an efficient method of using chlorin, because in the process of fluid sterilization by chlorin the principal disinfecting agent is not the chlorin itself but the oxygen liberated from water by the action of chlorin on the water. The liberated oxygen possesses its maximum disinfecting property at the moment of its liberation, or in its nascent state. When, therefore chlorinated lime, chlorinated soda, or chlorin gas is admixed with a quantity of water and this water is afterward used to disinfect or purify large quantities of other water a great loss of efficiency is the result. Moreover, chlorinated lime and chlorinated soda are both unstable compounds and their efficiency as disinfectants depends upon the amount of chlorin they will liberate when in contact with water. This available chlorin content is very variable in different specimens of either substance, and even in the same sample rapidly diminishes when contact with air is not prevented.

By my invention, I make it possible to use dry or anhydrous, practically chemically pure, chlorin, which is now placed upon the market in a liquefied state in steel cylinders or drums. So far as I am aware, the use of dry chlorin for treating water has not been attempted, and is a distinct advance in the art of water and sewage purification. I have discovered that dry purified chlorin gas is superior to chlorin compounds, (hypochlorites) and chlorinated water for purifying water for the following reasons: Unless the quantity used is greatly in excess of the quantity necessary, it imparts no taste or odor to the water. Its strength is constant and the quantity added to the water can be easily regulated, whereas hypochlorites vary greatly in strength and the quantity to be used cannot be quickly determined with accuracy. Chlorin gas is more effective than chlorin compounds because of the larger quantity of active (nascent) oxygen brought into actual contact with the water. Hypochlorites must be first dissolved in or mixed with water to liberate the chlorin and this chlorinated water then mixed with the water to be purified. Obviously a large portion of the oxygen liberated by the interaction of the chlorin and water is no longer active when admitted to the water to be purified. In my process the dry chlorin gas itself is conducted to the water to be purified, is absorbed by the water, and liberates oxygen within the water so that the contact between the water and the oxygen occurs when the oxygen is at the height of its efficiency as a purifying agent.

In the accompanying drawings, which form a part of this specification: Figure 1 is a sectional elevation of one form of apparatus adapted for purifying water or sewage in accordance with my invention; Fig. 2 is a horizontal cross-section of the water and gas mixing tank, the section being taken on the line 2—2 of Fig. 1; Figs. 3, 4, 5, and 6 show other forms of gas-controlling apparatus; Fig. 7 is a sectional view of a portable apparatus embodying my invention, and especially adapted for treating water; Fig. 7ª is a detail perspective view of the tanks shown in Fig. 7; Fig. 8 shows a means of introducing chlorin gas into a water or sewage conduit; Fig. 9 is a sectional view of another form of embodiment of my invention applied to a sewer or aqueduct; Fig. 10 is a horizontal section of the sewer or aqueduct shown in Fig. 9; and Fig. 11 shows a modification of Fig. 9.

In Figs. 1 and 2, A is a mixing tank or reservoir made of concrete, earthenware or other non-corrosive material, or of metal lined with such material, and filled with broken up coke, charcoal, slate, quartz, or with gravel or other suitable material. 1 is an inlet pipe for the raw water or sewage which is distributed by perforated piping 2 over the upper surface of the coke or other material of the mixing tank A. Said pipe 1, having a cock 1$^a$, leads from a tank 3 supplied by the water or sewage feed pipe 4 and having a float valve 3$^a$ to keep a constant level in said tank and thereby maintain a constant pressure in pipe 1. 5 is an inlet pipe for chlorin gas, which enters the lower part of the mixing tank A at an elevation above the bottom thereof and conducts the chlorin gas into piping 6 (Fig. 2) from which it passes into perforated distributing pipes 7. The piping 6 and 7 is preferably of glass, porcelain, earthenware or other suitable non-corrosive material. The chlorin gas escapes from the perforations in the pipes 7 and passing upward is evenly distributed by the coke or other broken material, and, coming in contact with the thin layers of water or sewage passing downward through said broken material, is absorbed and performs its function of purification. The perforated pipes 7 rest upon support or partitions 8 which divide the space in the tank A below said pipes into a number of spaces or compartments which are filled with the aforesaid broken material; and the partitions are provided with transverse openings or holes near the bottom for establishing communication between the several spaces or compartments. 9 is the outlet pipe for the purified water or sewage. Its discharge opening is placed at a slightly lower level than the tops of the partitions 8 on which are supported the perforated pipes 7, while its inner end is near the bottom of the mixing tank or reservoir. Hence in operation the space in the tank or reservoir below the pipes 7 is filled with water which prevents the chlorin gas from passing out through the pipe 9. The gas must therefore pass upward through the coke or broken material and meet the downcoming water or sewage as stated before. The outlet pipe 9 should be large enough to discharge all water delivered to the tank by the pipes 2. Water must not fill the tank above the level of pipes 7. The inflow can be regulated by the cock 1$^a$ in the water inlet pipe 1. B is a gas tank in which chlorin gas is at constant pressure, and from which the chlorin gas is supplied to the mixing tank or reservoir A through the aforesaid pipe 5 having a calibrated cock 10 for regulating the flow. There is also provided a pressure-gage 11 for indicating the pressure in the gas tank. C is a storage cylinder or container of liquefied chlorin under high pressure. It is provided with a cock 12 through which the gas can pass into the tube or pipe 13 leading to the gas-tank B. The gage 14 indicates the pressure in cylinder C when the stop-cock 12 is open. D is one form of gas-pressure regulator, comprising a stationary vessel 15 of lead or glass, partly filled with concentrated sulfuric acid or other fluid on which chlorin has no action, and a glass or earthenware vessel 16 smaller than the vessel 15 and placed bottom up in the latter. A glass tube 17, in communication with the gas tank B through pipe 18 extends up through the bottom of the vessel 15 near the top of the space inclosed by the inverted vessel or bell 16. The vessel 16 is operatively-connected by a link or connecting-rod 19 with a lever 20 controlling a cock or valve 21 in the pipe 13 which connects the storage cylinder C and gas tank B.

The operation is as follows: Previous to admission of chlorin gas to the gas tank B, the cock 10 leading to the mixing tank A should be closed. Then open the cock 12 of the cylinder C. Chlorin gas will now pass from the cylinder C to the gas tank B through the pipe 13, the cock or valve 21 being open or partially open when the bell 16 rests in its down position. As the pressure due to inflow of chlorin gas rises in B, it will be communicated through the tubes 17 and 18 to the interior of the gas-pressure regulator D, and when a sufficient pressure is reached it will lift the bell 16 and thereby operate the lever 20 to close the cock 21, which stops the flow of gas from the cylinder C. The cock 10 may then be opened, admitting the chlorin gas through pipe 5 to the mixing tank A, in which the gas is distributed by the perforated pipes 7 and passes up through the coke or broken material and becomes absorbed or dissolved by the downward trickling water or sewage as hereinbefore explained. But when the stop-cock 10 is opened the pressure falls in the gas tank B, as also in the gas-pressure regulator D, so that the bell or inverted vessel 16 will descend and operate the lever 20 to open the cock 21, thereby permitting more gas to pass from cylinder C to the gas tank B. This cycle is repeated as long as the cock 10 remains open; it stops automatically when the cock 10 is closed. Thus the gas cylinder B, having once been charged with gas from the cylinder C is kept at constant pressure, and by means of the cock 10 may be put into or shut off from communication with the mixing tank, at will, without changing the pressure.

Figs 3, 4, 5 and 6 show gas supply apparatus having other forms of gas-pressure regulators. In these figures the gas-tank B with outgoing pipe 5, calibrated cock 10 and gage 11, and the liquefied chlorin container C with its cock 12 and gage 14 are the same as in Fig. 1.

In Fig. 3 the gas-pressure regulator $D^1$, especially adapted for use with a portable apparatus is of the diaphragm type. It consists of a thin, flat, gas-tight box 22 made of thin copper, brass, tin, or other suitable material, such as india rubber. One side of the box is attached to a branch pipe 23 by means of which the chamber within the box is in communication with the pipe line 13 from cylinder C to the gas tank B. The other flexible or diaphragm-like side of the box is operatively-connected with the lever 24 which controls the cock or valve 25 in pipe 13. The lever 24 is so adjusted relative to the box that when the apparatus is in normal position the cock 25 is slightly open. When gas passes from cylinder C it causes a rise of pressure in the gas tank B, if cock 10 is closed, or if it is not open sufficiently to permit the gas to flow from B as fast as it flows into B. The rise of pressure in B is communicated to $D^1$, pushing out the disk or side of the box to which the lever 24 is connected and thereby operating the cock 25 to stop the flow of gas from cylinder C. As the pressure falls in B, and in the communicating chamber of $D^1$, the diaphragm-like side of the box recedes and opens the cock 25. These operations continue so long as the cock 10 is open. When cock 10 is closed the pressure rises in B and $D^1$ and closes cock 25.

In Fig. 4, the gas-pressure regulator $D^2$ comprises a closed chamber or receptacle 26 interposed in the pipe 13 leading from the cylinder C to the gas tank B. This receptacle is made of lead, glass or earthenware, and has a lower extension or acid well 27 connected by a lead or glass pipe 28 with an overflow pan 29. The well 27 is filled through the pan 29 and tube 28 with concentrated sulfuric acid until it floats a hollow lead or glass weight 30 attached to a lever 31 operating a valve 32 which controls the chlorin gas inlet to the chamber 26; and by floating said weight the lever is lifted and opens said valve. The stop-cock 10 between the gas tank B and mixing tank A being closed and the cock 12 of the gas cylinder being open, the chlorin gas enters the chamber 26 through the section of the pipe 13 leading from said chamber 26. The rise of pressure in the gas tank and chamber 26 depresses the level of the sulfuric acid, forcing it through the tube 28 into the overflow pan 29. This drops the float or weight 30 thus closing the valve 32 and stopping the passage of gas from cylinder C. When the cock 10 is opened, to admit chlorin gas to the mixing tank A, the pressure falls in the gas tank B and in the chamber 26 and atmospheric pressure will then force the sulfuric acid in pan 29 back into the well 27 lifting the float or weight 30 and again opening the valve 32 to allow gas to pass from the cylinder C. If the gas-pressure regulator $D^2$ in Fig. 4 were made large enough, the gas tank B would not be required. In this case the chamber 26 of the gas-pressure regulator would be connected directly with the mixing tank A by the pipe 3, the stop cock 10 being placed at some point in said pipe.

In Fig. 5 the gas-pressure regulator $D^3$ is composed of two telescopically arranged cylinders 33 having opposite closed heads, as shown. To prevent telescoping movement and at the same time keep the cylinders gas-tight, the cylinders are connected by a wide flexible band 35 which may be of india rubber or specially treated soft leather, cloth, or other fabric not acted on chemically by dry chlorin gas; the band being adapted to fold as shown when the upper cylinder is down, and permitting the upper cylinder to be lifted a considerable distance. The cylinders or vessels 33 and 34 may be made of metal, glass or other suitable material. The lower cylinder is connected between the sections of the pipe 13 leading from cylinder C to the gas tank B, and the upper cylinder is operatively connected to a lever 36 which controls a valve 37 in the pipe 13 between C and $D^2$. When the upper cylinder is down as shown in the drawing, the cup or valve 37 is slightly open. The rise of pressure in the gas-pressure regulator forces the cylinders apart and operates the lever 36 to close the valve and when the pressure falls, the upper cylinder descends by gravity assisted by atmospheric pressure and operates the lever 36 to open the valve, which operation continues while the cock 10 remains open, as will be understood.

In Fig. 6, instead of a gas-pressure regulator, such as provided in the preceding figures, a reducing valve $D^4$ is arranged in the pipe 13 for reducing the high pressure in cylinder C to a constant low pressure in the gas tank B. The reducing valve is well-known to steam fitters and engineers, having long been used for the purpose of reducing high pressure in boilers, etc., to a uniform low pressure. The gas from the cylinder C passes into the reducing valve at 38 and out at 39, the pressure being regulated by the key 40. The reducing valve should be constructed of metal or metals not corroded by dry chlorin gas.

Figs 7 and $7^a$ show one form of small portable apparatus adapted for purifying water. The mixing tank $a$ is constructed on the same general principle as the tank A in Fig. 1, being filled with broken coke, stone, glass, pebbles, or the like, and having the pure water outlet at the bottom arranged relative to the perforated distributing pipes for the chlorin gas, as previously explained. At the top of the tank may be secured a perforated or reticulated metal cover 41 for keeping the broken material in place, said cover having a dished form. The water may be fed into a bucket or vessel 42 having a bottom orifice 43. If the water in 42 is kept at practically a constant level, it will deliver into the tank $a$ a fairly uniform quantity. The amount of chlorin is regulated by the calibrated cock in the gas pipe, the water trickling down through the broken or granular material absorbs the rising chlorin gas and is purified thereby, as in Fig. 1. The apparatus for supplying the gas comprises a small cylinder $c$ of liquefied chlorin and a small gas tank $b$, both of which are or may be supported in a suitable frame 44, as shown. The gas tank $b$ is also the pressure chamber for a gas-pressure regulator; the said tank being expansible under internal pressure, or else having a diaphragm-like side, and being operatively connected to a lever 45 which controls a valve 46 in the pipe leading from $c$ to $b$. The operation will be readily understood. As the gas pressure is reduced in $b$ its side connected to lever 45 moves inward to normal position, opening valve 46, and as the pressure rises, its side moves and closes said valve.

Fig. 8 shows another apparatus for introducing the chlorin gas into and mixing it with the water or sewage to be purified. 47 is a water or sewage pipe having valves or cocks 48 and 49 to regulate the flow. The chlorin gas delivery pipe 5 leading from the gas tank B in which constant low pressure is maintained by one of the apparatus previously described, enters the pipe 47 below the valve 48. The valves 48 and 49 are so adjusted that 48 delivers less water than 49 is capable of discharging, thereby causing a partial vacuum below the valve 48 in the vicinity of the chlorin gas inlet. The chlorin mixes with the water as it flows along the pipe to valve 49. It is possible to get a more thorough commingling or mixture by having the pipe 47 formed with angles or elbows between the valves, but this is not necessary if the distance from the chlorin inlet to the valve 49 is sufficiently great.

Figs. 9 and 10 show an apparatus for introducing the chlorin gas into and mixing with the water or sewage flowing through an aqueduct or sewer, and in which the supply of chlorin gas is automatically controlled by the flow of water or sewage.

A gas supply and regulating apparatus such as previously described has its gas-tank B provided with a delivery pipe 50 communicating by branch pipes 51 with a parallel pipe 52. From 52 a pipe 53 leads into the sewer or aqueduct and supplies a perforated gas distributer 54 located in the bottom of the sewer or aqueduct. In the sewer or aqueduct a series of floats 55, at successively different elevations, are attached to vertical rods 56 which operate levers 57 controlling valves or cocks 58 in the respective branch pipes 51, between 50 and 52. Projections 59 on the rods 56 limit their upward and downward movement. The calibrated cock in the pipe 50 is adjusted to permit the passage of the amount of chlorin gas sufficient for the maximum flow of water or sewage. This gas passes through the cocks 58, each of which is closed when its float is down and opened when its float is lifted, so that the whole amount of chlorin gas will pass into the sewer or aqueduct only when the fluid level therein is high enough to lift all the floats; and the supply of chlorin gas diminishes as the fluid level falls and is automatically proportioned as will be readily understood.

Baffles 60 arranged in the sewer or aqueduct beyond the chlorin gas distributer effect admixture of the gas and water. The sewer is expanded laterally to accommodate the baffles, as shown in Fig. 10. Instead of the baffles for mixing, a construction like Fig. 11 may be used where sufficient fall is available. Here the mixing is effected by the water or sewage tumbling or falling down a series of steps or falls 61 just beyond the point where the chlorin gas is introduced.

While I have illustrated a number of constructions, it will be understood that the forms of apparatus shown are not the only ones in which the invention may be embodied.

It may be added that for sewage disinfection the essential feature is that chlorin gas in sufficient amount be well mixed with the sewage. It makes no especial difference, except from an economical standpoint, if a little more chlorin than needed is used. In the sterilization or purification of water the case is different; here it is necessary to avoid any considerable excess of chlorin unless it be removed by further treatment. As a general rule, it may be said that water will require from 1/100 to 1/30 of a grain per gallon and sewage from 1/16 to 5/8 of a grain per gallon; the amount depending upon the degree of pollution. These amounts are very minute, being about 2/3 to 1/2 of one part per million in the case of water and one to ten parts per million in the case of sewage. The proportionate supply of chlorin to the volume of water or sewage flowing will, of course, be effected by proper adjustment of the valves of the apparatus.

Having described my invention, what I claim as new and desire to secure by Letters Patent is:

1. The process of purifying water or sewage which consists in introducing minute quantities of dry chlorin gas into the fluid to be treated.

2. The process of purifying water or sewage which consists in introducing dry chlorin gas into the fluid to be treated under uniform pressure and maintaining a constant relation between the volume of the gas and the volume of the water.

3. The process of purifying water or sewage which consists in continuously introducing minute quantities of dry chlorin gas into the fluid to be treated under a uniform low pressure and in a direction out of coincidence with the direction of the flow of the water.

4. The process of purifying liquids which consists in establishing a supply of dry chlorin gas under high pressure, and admitting said gas to the liquid to be treated under a uniform low pressure.

In testimony whereof I affix my signature, in presence of two witnesses.

CARL R. DARNALL.

Witnesses:
 E. V. WEBSTER,
 OSGOOD H. DOWELL.